United States Patent [19]
Pierce et al.

[11] 3,771,812
[45] Nov. 13, 1973

[54] AIR SUSPENSION WITH IMPROVED AXLE LIFTING STRUCTURE
[75] Inventors: William C. Pierce; Paul W. Fuller, both of Muskegon, Mich.
[73] Assignee: Lear Siegler, Inc., Santa Monica, Calif.
[22] Filed: Apr. 25, 1972
[21] Appl. No.: 247,265

[52] U.S. Cl............................ 280/124 F, 180/24.02
[51] Int. Cl............................................. B60g 17/00
[58] Field of Search ..................... 180/22 E, 24.02; 280/124 R, 124 F

[56] References Cited
UNITED STATES PATENTS
3,674,249   7/1972   McGee............................ 280/124 R Primary Examiner—Philip Goodman
Attorney—Arthur Raisch et al.

[57] ABSTRACT

Each of a pair of levers pivoted on the vehicle frame is urged upwardly by a tensioned coil spring and through a link (chain), exerts force for lifting the axle and wheels upon relief of pressure in the air springs. Variations of the coil spring force and of lever arms acting between the pivot axes and axes of the springs and links are correlated so that the lifting force on the axle is less in downward position than in raised position.

14 Claims, 5 Drawing Figures

PATENTED NOV 13 1973　　3,771,812

AIR SUSPENSION WITH IMPROVED AXLE LIFTING STRUCTURE

This invention relates generally to an air suspension for automotive vehicles and more particularly to an air suspension which incorporates a lifting device which automatically lifts the axle when pressure is relieved in the air springs for raising the wheels out of engagement with the ground.

Suspensions of the type under consideration have a pair of control arms mounted for vertical swinging adjacent opposite sides of the vehicle frame. The axle is secured to these control arms and air springs are interposed in load transmitting relation between the control arms and frame.

The conventional axle lifting structure comprises one or more stressed mechanical springs such as coil springs or leaf springs acting directly between the vehicle frame and axle. When air is relieved from the air springs the mechanical springs pull the axle upwardly, the stress in the spring diminishing. The mechanical springs in their condition of diminished stress must still exert sufficient force to support the weight of the control arms, axle and wheels thereon so that the wheels are held out of engagement with the ground. When the air springs are pressurized, the wheels are forced downwardly into ground engagement and the mechanical springs are flexed with the result that the upward force of the mechanical springs on the axle increases. This is undesirable for the following reason.

Air suspensions are designed to carry a specified maximum load. The lifting force of the mechanical springs on the axle constitutes preloading of the suspension. Therefore the suspension cannot be loaded to its designed maximum but can only be loaded to that maximum less the load represented by the lifting force of the mechanical springs on the axle. Since this force in downward position of the conventional suspension exceeds the force required to hold the suspension in raised position, permissible load on the suspension is sacrificed to an undesirable extent.

The object of this invention is to provide an air suspension having a relatively simple, inexpensive axle lifting structure improved so that the lifting force of the springs on the axle in its downward position is less or no greater than that necessary to support the suspension in its raised position whereby to minimize the sacrifice of pay load.

Generally the invention contemplates the use of a lever pivoted on each side of the vehicle frame and urged upwardly by the stressed mechanical spring. A lifting link is provided between each lever and axle. The spring and link exert force along lines displaced from the pivot axis so that lever arms are created between the pivot axis and the spring and link. The lever arms vary in length as the lever is swung about its pivot and these variations are correlated with variations in the force of the spring so that the mechanical advantage of the system increases as the suspension is raised and decreases as the suspension is lowered.

One form of the invention is illustrated in the following drawings.

Figure 1:
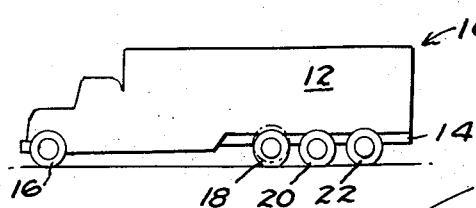
FIG. 1 is a diagrammatic side elevational view of a vehicle utilizing a suspension according to the present invention.

Shown in the drawings is a vehicle 10 having a body 12 mounted on a frame 14 from which a set of front wheels 16 and three sets of tandem arranged rear wheels 18, 20 and 22 are suspended. Wheels 18 are suspended through a suspension 24 according to the present invention.

Suspension 24 includes a pair of control arms 26 pivotally mounted at 28 to brackets 30 depending from the sides of frame 14 and an axle 32 is anchored to control arms 26 by such means as U-bolts 34 and nuts 36 thereon. An air spring 38 is disposed in load transmitting relation between each control arm 26 and frame 14. In the structure illustrated, spring 38 is of the rolling lobe type and is mounted beneath frame 14 by a bracket 40. Each air spring includes a piston element 42 mounted on a control arm 26. Within spring 38 is a convention rubber bumper or stop 43 against which the top of piston 42 bottoms in extreme upward position of control arms 26.

A lever 44 is mounted for vertical rocking movement on each side of frame 14 through a pivot or fulcrum 46. The pivots are coaxial. A tensioned coil spring 48 has one end 50 connected to lever 44 above pivot 46, the other end 52 of the spring being anchored on frame 14 by suitable means such as a screw eye 54 and nut 56 thereon engaged with a bracket 58 on the frame 14. The tension of spring 48 can be adjusted by turning nut 56 relative to screw 54.

An axle lifting link 60 illustrated as a chain has an upper end 62 secured to lever 44 by suitable means such as a clevis 64 on the lever and a bolt 66 passing through the clevis and link. The lower end 68 of the link is secured to axle 32 by such means as an apertured lug 70 anchored on the axle and a bolt 72 passing through the lug and link.

In both the downward position (FIGS. 2 and 4) and raised position (FIGS. 3 and 5) of suspension 24 each spring 48 acts upon a line which is displaced above the axis of pivot 46. This creates a lever arm between the spring and pivot 46 whose length $L_1$ varies from a minimum to a maximum as lever 44 is rocked from its downward position (FIG. 4) to its raised position (FIG. 5). Each link 60 is displaced horizontally from pivot 46 in both downward and raised positions of suspension 24. This creates a lever arm between pivot 46 and the longitudinal axis of link 60, this lever arm having a length $L_2$ which varies from a maximum to a minimum when lever 44 is rocked from its downward position to its raised position.

In use, let it be assumed initially that air springs 38 have been inflated to their normal pressure for assuming load from frame 14. The force of the air springs is adequate to rock control arms 26 and axle 32 downwardly so that wheels 18 are engaged against the ground. This condition of the suspension is illustrated in solid lines in FIGS. 1 and 2 and in FIG. 4.

When vehicle 10 is operating unloaded or only lightly loaded, suspension 24 is frequently not needed to support the load of the vehicle. In this situation, the pressure in air springs 38 is relieved whereupon the lifting force of coil springs 48 acting on axle 32 through levers 44 and links 60 raises the axle from the position of FIGS. 2 and 4 to the position of FIGS. 3 and 5 so that wheels 18 are elevated out of contact with the ground as shown in dotted lines in FIGS. 1 and 2. The lifting force of springs 48 is sufficient to hold suspension 24 upwardly with the top of piston 42 (not shown) bottomed against bumper 43 within air spring 38.

When it becomes necessary again to use suspension 24 for carrying a portion of the vehicle load air springs 38 are reinflated to their normal operating pressure. This forces control arms 26 and axle 32 downwardly against the lifting force of springs 48 to re-engage wheels 18 against the ground.

Figure 4:
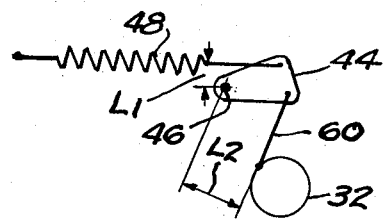
FIG. 4 is a schematic view of parts of the suspension in its downward position.
Figure 5:
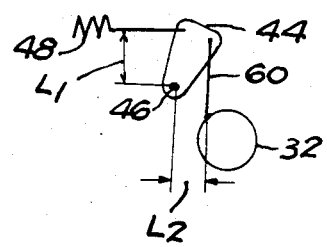
FIG. 5 is a schematic view of the same parts of the suspension in its raised position.

Reference is now made to FIGS. 4 and 5. In these views the range of rocking movement of lever 44 is exaggerated for purposes of illustration. When suspension 24 is in its raised position springs 48 are in relatively contracted condition and accordingly they exert relatively small force on lever 44. However, as illustrated in FIG. 5 at this time the length of lever arm $L_1$ is relatively large and the length of lever arm $L_2$ is relatively small. Viewing the force of springs 48 as the applied effort and the weight of the suspension on links 60 as the load, the mechanical advantage in the system is relatively large so that the force exerted by springs 48 in their contracted condition is adequate to support the suspension.

When the suspension is swung downwardly under the force of inflating air springs 38, levers 44 swing downwardly from the FIG. 5 position to the FIG. 4 position and during this movement springs 48 are extended and exert progressively greater force on levers 44. However, at the same time, the length of lever arm $L_1$ decreases from its maximum to its minimum and the length of lever arm $L_2$ increases from its minimum to its maximum. Accordingly, the mechanical advantage in the system decreases and compensates for the increased force exerted by springs 48. Springs 48 thus exert no greater lifting force on axle 32 in the downward position of the suspension than in the raised position of the suspension.

Figure 2:
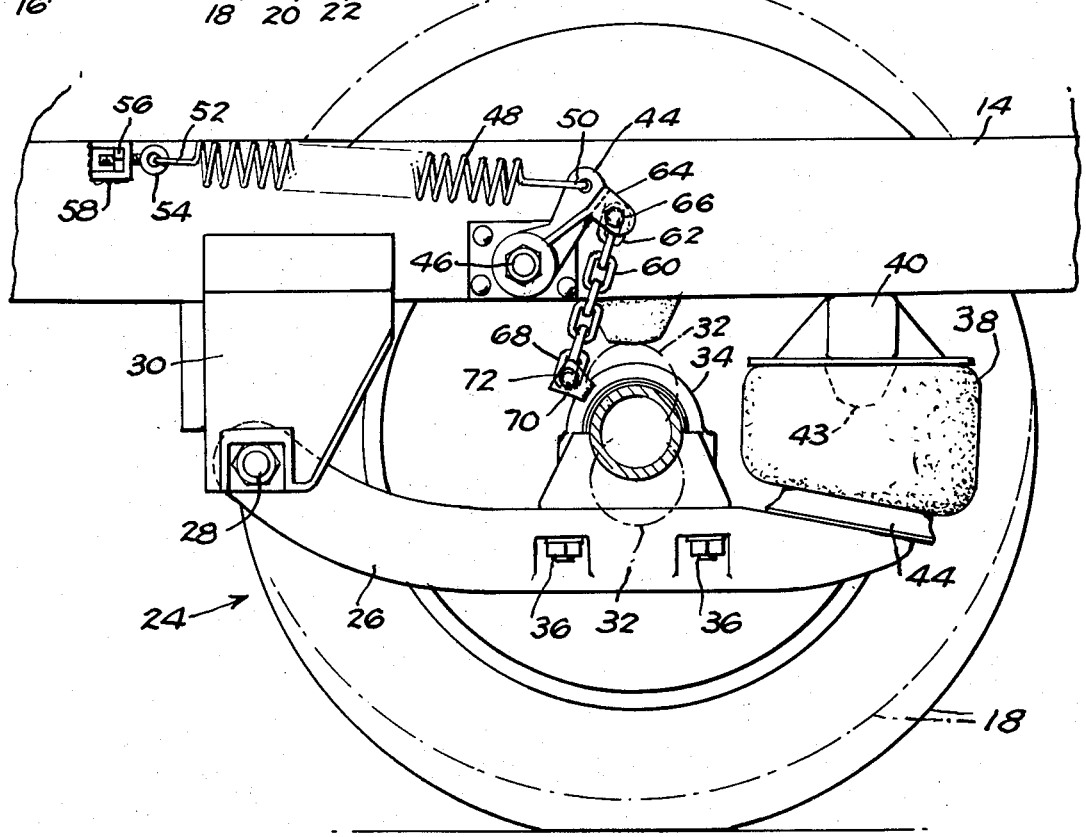
FIG. 2 is a fragmentary view partly in elevation and partly in section illustrating a suspension according to the present invention in its downward position.
Figure 3:
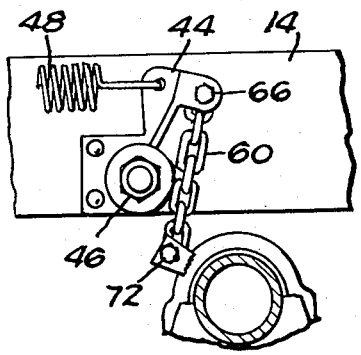
FIG. 3 is a fragmentary view partly in elevation and partly in section illustrating components of the suspension in its raised position.

During highway use of the suspension with wheels 18 in their downward position, control arms 26 will occasionally swing downwardly relative to frame 14 as when the wheels drop into a depression, whereupon axle 32 will shift downwardly to the lower dotted line position of FIG. 2. When this occurs the stress in springs 48 increases but lever arm $L_1$ further decreases and lever arm $L_2$ further increases so that the lifting force of springs 48 on the axle does not increase.

A typical suspension 24 is designed to carry a load of 20,000 pounds and together with wheels 18 weighs about 1500 pounds. In raised position of the suspension each spring 48 exerts about 560 pounds force on its lever 44 which results in a lifting force of about 1,245 pounds by each link 60 for a total of about 2,490 pounds lifting force on axle 32. As the suspension is swung downwardly the force of each spring 48 on its lever 44 progressively increases to about 960 pounds but the lifting force of each link 60 decreases to about 425 pounds because of the progressive decrease of the mechanical advantage in the system. Thus suspension 24 can be loaded to 20,000 pounds less 850 pounds or 19,150 pounds.

By way of comparison, if springs 48 were connected directly between axle 32 and frame 14, they would have to exert a total of about 2,490 pounds lifting force on the suspension in its raised position in order to maintain wheels 18 out of contact with the ground. Upon lowering of the suspension for road use, springs 48 would be extended and would exert a combined lifting force estimated at about 4,980 pounds on axle 32 and the total permissible load on the suspension would be 20,000 pounds minus 4,980 pounds or 15,020 pounds.

Links 60 are preferably flexible members such as the chain illustrated or cables. This eliminates alignment problems which might exist if a rigid link were employed between lever 44 and axle 32. Also, a rigid link would be subject to permanent deformation should it be struck a sharp blow and such deformation could cause improper functioning or failure of the axle lifting mechanism.

We claim:

1. In an automotive vehicle suspension having an axle for ground engaging wheels secured to a pair of control arms mountable for vertical swinging adjacent opposite sides of the vehicle frame and air springs mountable in load transmitting relation between the control arms and frame, improved structure for lifting said axle and wheels thereon responsive to relief of air pressure in said springs which comprises, lever means adapted to be mounted on said frame through fulcrum means for swinging between one position and another position, said lever means and fulcrum means being in addition to said control arms and their mounts, spring means adapted to be mounted on said frame so as to exert force for swinging said lever means toward said one position, linking means effective to exert lifting force on said axle responsive to swinging of said lever means from said other position toward said one position, said lever, spring, and linking means being correlated so that when mounted on said frame said spring force and lifting force act along lines which vary in distance from said fulcrum means responsive to swinging of said lever means, said distance of said spring force line increasing and said distance of said lifting forcee line decreasing responsive to swinging of said lever means from said other position toward said one position.

2. The structure defined in claim 1 wherein said spring force varies from a larger magnitude toward a smaller magnitude responsive to swinging of said lever means from said other position toward said one position.

3. The structure defined in claim 2 wherein the variations of said distances and spring force are correlated so that said lifting force is no greater in said other position than in said one position.

4. The structure defined in claim 2 wherein the variations of said distances and spring force are correlated so that said lifting force is less in said other position than in said one position.

5. The structure defined in claim 3 wherein said one position is an upper position and said other position is a lower position.

6. The structure defined in claim 3 wherein said spring means comprises a coil spring.

7. The structure defined in claim 6 wherein said coil spring is stressed in tension.

8. The structure defined in claim 1 wherein said linking means includes a flexible element connected between said lever means and axle.

9. The structure defined in claim 8 wherein said flexible element comprises a chain.

10. The structure defined in claim 1 wherein said lever means comprises a single lever and said fulcrum means comprises a pivot.

11. The structure defined in claim 4 wherein said lever means comprises a single lever, said fulcrum means comprising a pivot, said one position being an upper position and said other position being a lower position, said spring means comprising a coil spring connected with said lever and adapted to be stressed in tension, said linking means comprising a flexible element connected between said lever and axle.

12. In combination an automotive vehicle and a suspension as defined in claim 1 mounted thereon.

13. In combination an automotive vehicle and a suspension as defined in claim 3 mounted thereon.

14. In combination an automotive vehicle and a suspension as defined in claim 11 mounted thereon.

* * * * *